(12) United States Patent
Wang et al.

(10) Patent No.: US 11,150,692 B2
(45) Date of Patent: Oct. 19, 2021

(54) ELECTRONIC DEVICE WITH SENSORS AND DISPLAY DEVICES

(71) Applicant: Apple Inc., Cupertino, CA (US)

(72) Inventors: Paul X. Wang, Cupertino, CA (US); Jie Gu, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/540,888

(22) Filed: Aug. 14, 2019

(65) Prior Publication Data

US 2019/0369936 A1 Dec. 5, 2019

Related U.S. Application Data

(63) Continuation of application No. 15/729,394, filed on Oct. 10, 2017, now Pat. No. 10,474,417.
(Continued)

(51) Int. Cl.
*G06F 3/147* (2006.01)
*G06F 3/01* (2006.01)
(Continued)

(52) U.S. Cl.
CPC .......... *G06F 1/1613* (2013.01); *G06F 1/1633* (2013.01); *G06F 1/1637* (2013.01);
(Continued)

(58) Field of Classification Search
CPC .... G06F 1/1613; G06F 1/1633; G06F 1/1637; G06F 2203/04106; G06F 2203/04108;
G06F 3/017; G06F 3/044; G06F 3/147; G06F 3/167; G10L 15/08; G10L 15/265; G10L 2015/088; H04N 2005/4426;
(Continued)

(56) References Cited

U.S. PATENT DOCUMENTS 7,418,392 B1 8/2008 Mozer et al.
8,731,942 B2 5/2014 Cheyer et al.
(Continued)

FOREIGN PATENT DOCUMENTS

CN 104635927 A 5/2015
CN 106155200 A 11/2016
(Continued)

*Primary Examiner* — Hong Zhou
(74) *Attorney, Agent, or Firm* — Treyz Law Group, P.C.; G. Victor Treyz; David K. Cole (57) ABSTRACT

An electronic device may have a housing. The housing may be characterized by a vertical axis and may have housing structures such as cylindrical housing structures with a cylindrical surface. A speaker may be mounted in the housing to provide sound through openings in the housing structures. A visual output device may be mounted in the housing to provide light through openings in the housing structures. The visual output device may include an electrophoretic display, a light-emitting diode display, or other display with an array of pixels that display images or may include other components for emitting light. During operation, voice commands may be received by a microphone in the device and action taken based on the commands and other information. The action taken may include playing sound with the speaker and providing visual output with the visual output device.

9 Claims, 8 Drawing Sheets

Related U.S. Application Data (60) Provisional application No. 62/535,161, filed on Jul. 20, 2017.

(51) Int. Cl.

| | | |
|---|---|---|
| *G06F 3/16* | (2006.01) | |
| *G06F 3/044* | (2006.01) | |
| *G10L 15/08* | (2006.01) | |
| *G10L 15/26* | (2006.01) | |
| *H04N 5/44* | (2011.01) | |
| *H04N 5/445* | (2011.01) | |
| *H04R 1/02* | (2006.01) | |
| *G06F 1/16* | (2006.01) | |
| *H04N 21/422* | (2011.01) | |

(52) U.S. Cl.
CPC .............. *G06F 3/017* (2013.01); *G06F 3/147* (2013.01); *G06F 3/167* (2013.01); *G10L 15/08* (2013.01); *G10L 15/26* (2013.01); *H04N 5/44504* (2013.01); *H04N 21/42204* (2013.01); *H04R 1/023* (2013.01); *H04R 1/028* (2013.01); *G06F 3/044* (2013.01); *G06F 2203/04106* (2013.01); *G06F 2203/04108* (2013.01); *G10L 2015/088* (2013.01); *H04N 21/42206* (2013.01); *H04N 21/42221* (2013.01); *H04N 21/42222* (2013.01); *H04R 2420/07* (2013.01)

(58) Field of Classification Search
CPC ... H04N 2005/4428; H04N 2005/4432; H04N 5/4403; H04N 5/44504; H04R 1/023; H04R 1/028; H04R 2420/07
See application file for complete search history.

(56) References Cited

U.S. PATENT DOCUMENTS

| | | | |
|---|---|---|---|
| 9,304,736 B1 | 4/2016 | Whiteley et al. | |
| 9,368,105 B1 | 6/2016 | Freed et al. | |
| 9,424,840 B1 | 8/2016 | Hart et al. | |
| 9,588,551 B1 | 3/2017 | Hegde et al. | |
| 9,721,586 B1 | 8/2017 | Bay et al. | |
| 9,786,294 B1 | 10/2017 | Bezos et al. | |
| 9,864,576 B1 | 1/2018 | Liu et al. | |
| 10,360,876 B1 * | 7/2019 | Rahman | G06F 3/1423 |
| 10,499,026 B1 * | 12/2019 | Banta | H04N 9/3185 |
| 2007/0119698 A1 | 5/2007 | Day | |
| 2008/0088553 A1 | 4/2008 | Yokodate et al. | |
| 2010/0302169 A1 | 12/2010 | Pance et al. | |
| 2011/0179368 A1 | 7/2011 | King et al. | |
| 2012/0157073 A1 | 6/2012 | Kim et al. | |
| 2012/0315820 A1 | 12/2012 | Goff et al. | |
| 2013/0185081 A1 | 7/2013 | Cheyer et al. | |
| 2013/0298039 A1 | 11/2013 | Mestre | |
| 2014/0002754 A1 | 1/2014 | Qi et al. | |
| 2014/0340877 A1 * | 11/2014 | Nelson | F21V 33/0008 |
| | | | 362/103 |
| 2014/0343946 A1 | 11/2014 | Torok et al. | |
| 2015/0067552 A1 * | 3/2015 | Leorin | G06F 3/0481 |
| | | | 715/765 |
| 2015/0193193 A1 | 7/2015 | Khaira et al. | |
| 2015/0258432 A1 * | 9/2015 | Stafford | A63F 13/213 |
| | | | 463/32 |
| 2015/0279387 A1 | 10/2015 | List | |
| 2015/0314454 A1 | 11/2015 | Breazeal et al. | |
| 2015/0324167 A1 | 11/2015 | Calatayud | |
| 2015/0340795 A1 | 11/2015 | Lee et al. | |
| 2016/0034152 A1 * | 2/2016 | Wilson | G06F 3/04847 |
| | | | 715/835 |
| 2016/0077793 A1 | 3/2016 | Disano et al. | |
| 2016/0163315 A1 | 6/2016 | Choi et al. | |
| 2016/0240194 A1 | 8/2016 | Lee et al. | |
| 2016/0253146 A1 * | 9/2016 | Yang | H04N 5/60 |
| | | | 381/107 |
| 2016/0320806 A1 | 11/2016 | Myers et al. | |
| 2016/0373909 A1 | 12/2016 | Rasmussen et al. | |
| 2017/0006374 A1 | 1/2017 | Song et al. | |
| 2017/0142533 A1 | 5/2017 | Park et al. | |
| 2017/0206900 A1 | 6/2017 | Lee et al. | |
| 2017/0205923 A1 * | 7/2017 | Shim | G06F 3/0414 |
| 2017/0278477 A1 * | 9/2017 | Jeong | G06F 3/16 |
| 2018/0074785 A1 * | 3/2018 | Ohmura | G06F 3/0487 |
| 2018/0096688 A1 | 4/2018 | Kim et al. | |
| 2018/0174584 A1 * | 6/2018 | Chih | H04R 3/005 |

FOREIGN PATENT DOCUMENTS

| | | | |
|---|---|---|---|
| CN | 205692496 U | 11/2016 | |
| CN | 205829976 U | 12/2016 | |
| CN | 106537933 A | 3/2017 | |
| CN | 206293923 U | 6/2017 | |
| JP | 2015052945 A | 3/2015 | |
| JP | 2016122445 A | 7/2016 | |
| JP | 2017111200 A | 6/2017 | |
| TW | 200916002 A | 4/2009 | |
| WO | 2016025890 A1 | 2/2016 | |
| WO | WO-2016157662 A1 * | 10/2016 | G06F 3/0487 |

\* cited by examiner

ELECTRONIC DEVICE WITH SENSORS AND DISPLAY DEVICES

This application is a continuation of patent application Ser. No. 15/729,394, filed on Oct. 10, 2017, which claims the benefit of provisional patent application 62/535,161, filed on Jul. 20, 2017, each of which is hereby incorporated by reference herein in its entirety.

FIELD

This relates generally to electronic devices and, more particularly, to devices with displays.

BACKGROUND

Electronic devices may include light-emitting components such as displays. It can be challenging to incorporate components such as these into an electronic device. If care is not taken, information on a display will not be visible to a viewer or will not be of interest to a user.

SUMMARY

An electronic device may have a housing. The housing may be characterized by a vertical axis and may have housing structures such as cylindrical housing structures with a cylindrical surface and circular periphery that extends around the vertical axis or other suitable housing structures (e.g., cube-shaped housing structures having planar surfaces and a rectangular periphery, pyramidal housing structures, cone-shaped housing structures, truncated cone housing structures, cylindrical housing structures with an slanted truncated top, etc.). A speaker may be mounted in the housing and may provide sound through openings in the housing structures. The speaker may be used to play songs and present other audible media for a user of the electronic device. In some configurations, synthesized voice may be provided using the speaker. If desired, the housing may be hollow (e.g., the electronic device may be a sleeve or other accessory cover that is configured to fit over the exterior surface of another device such as a main electronic unit).

A visual output device may be mounted in the housing of a stand-alone device or a housing associated with an accessory. The visual output device may emit light through openings in the housing structures. The visual output device may include an electrophoretic display, liquid crystal display, light-emitting diode display, or other display with an array of pixels to display images. In some configurations, the visual output device may include other components for emitting light (e.g., one or more light-emitting diodes that provide direct illumination or that supply backlight illumination for patterned openings in the housing such as icons or other symbols, etc.).

During operation, voice commands may be received by a microphone in the device and action taken based on the commands and other information. The action taken may include playing sound with the speaker and providing visual output with the visual output device. The visual output that is provided may include text, video and/or other still and moving images. In some configurations, visual output may be scrolled horizontally or vertically on the visual output device. For example, the visual output device may have an array of pixels that extends in a band around the circumference of the housing and text or other content may be scrolled horizontally around the housing.

The electronic device may include sensors for monitoring the environment and circuitry for communicating with external electronic equipment. Voice commands and other user input may be received by the electronic device. The electronic device may also use cameras and other components to gather information on the environment in which the electronic device is operating. User input and other information may be used in determining how to display information on the visual output device and/or how to present audio content using the speaker.

DETAILED DESCRIPTION

Electronic devices may be provided with components for gathering input from a user and from the environment. Based on this information, an electronic device may provide users with output. For example, a user may supply touch commands, voice commands, button press input, or other input to a device and the device may provide corresponding audio and visual output.

Figure 1:
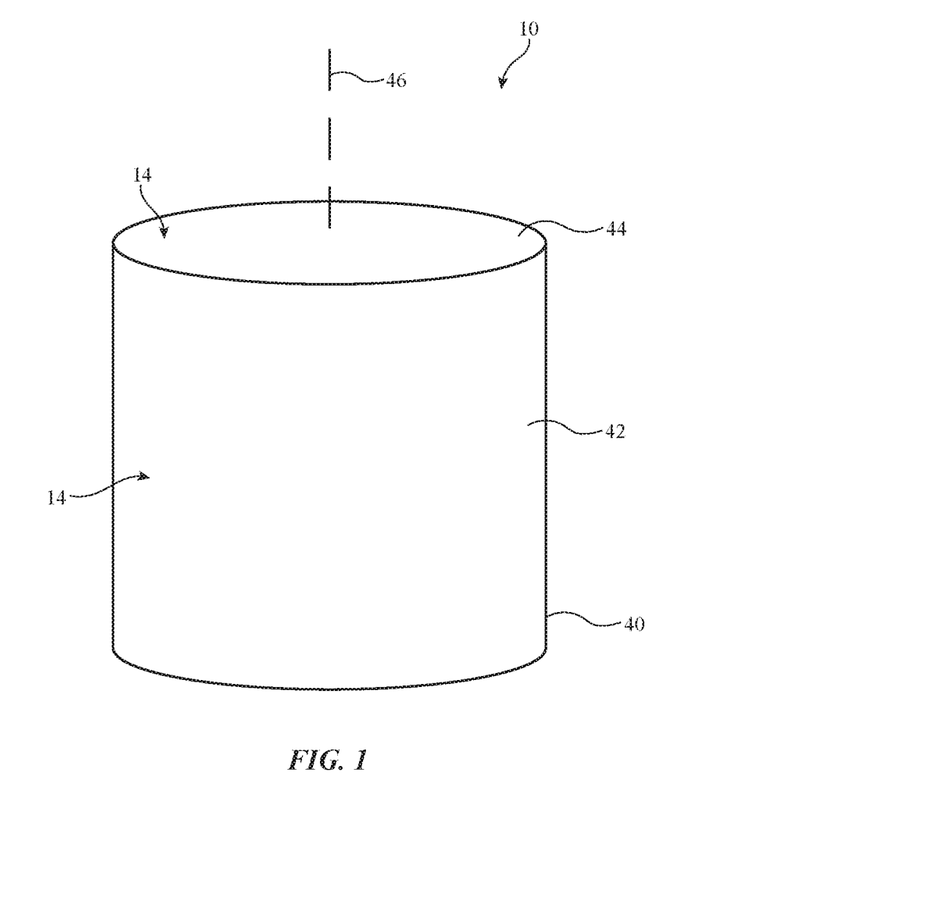
FIG. 1 is a perspective view of an illustrative electronic device in accordance with an embodiment.

An illustrative electronic device of the type that may gather input and supply corresponding output is shown in FIG. 1. Electronic device 10 of FIG. 1 may be a computing device such as a voice-controlled assistant, a laptop computer, a computer monitor containing an embedded computer, a tablet computer, a cellular telephone, a media player, other handheld or portable electronic devices, a smaller device such as a wristwatch device (e.g., a watch with a wrist strap), a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment. In the illustrative configuration of FIG. 1, device 10 is a voice-controlled assistant device (e.g., a countertop speaker). This is merely illustrative. Other configurations may be used for device 10 if desired. The example of FIG. 1 is merely illustrative.

In the example of FIG. 1, device 10 includes one or more visual output devices 14. In some configurations, visual output devices 14 may include arrays of pixels that display images. In other configurations, visual output devices 14 serve as status indicator lights, provide illumination for patterned openings (e.g., openings in the shape of icons, etc.), and/or otherwise provide light-based output without necessarily being able to display images. Because embodiments of visual output devices 14 may include pixel arrays for displaying images, visual output devices 14 may sometimes be referred to as displays 14. This is merely illustrative. If desired, device 10 may include visual output devices based on one or a few light-emitting diodes, lamps, or other light-emitting components that do not display images.

As shown in FIG. 1, light-emitting devices such as displays 14 may be supported by support structures in device 10 such as housing 40. For example, a display may be formed on upper surface 44 of housing 40 and/or on sidewall surface 42 of housing structures in housing 40. Housing structures for housing 40, which may sometimes be referred to as an enclosure or case, may be formed of plastic, glass, ceramics, fabric, fiber composites, metal (e.g., stainless steel, aluminum, titanium, gold, etc.), other suitable materials, or a combination of any two or more of these materials. Housing 40 may be formed using a unibody configuration in which some or all of housing 12 is machined or molded as a single structure or may be formed using multiple structures (e.g., an internal frame structure, one or more structures that form exterior housing surfaces, etc.).

Displays 14 may be a touch sensitive displays or may be insensitive to touch. A touch sensitive display may incorporate a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures. If desired, force sensors may overlap displays 14 (e.g., so that a user may supply force-based input commands by pressing downwards on the display).

Each display 14 may include an array of pixels formed from liquid crystal display (LCD) components, an array of electrophoretic pixels, an array of plasma pixels, an array of organic light-emitting diode pixels or other light-emitting diodes (e.g., micro-light-emitting diodes, light-emitting diodes in plastic packages, etc.), an array of electrowetting pixels, or pixels based on other display technologies.

In the example of FIG. 1, housing 40 of electronic device 10 has a cylindrical shape and exhibits rotational symmetry around longitudinal (vertical) axis 46. Device 10 may have other shapes, if desired. For example, device 10 may have a rectangular box shape, a pyramidal shape, a truncated cone or truncated cylindrical shape such as a cylindrical shape of the type shown by device 10 of FIG. 1 in which upper surface 44 is tilted, spherical shapes, hemispherical shapes, etc.). During operation, a user may supply voice commands and other input to device 10 and, in response, device 10 may control home automation functions (e.g., via wirelessly connected home equipment), may play content such as audio and video, may process online database search requests (e.g., internet searches), may process orders for products and services, may provide a user with calendar information, may receive and process email, may run games or other software, may handle audio communications (e.g., telephone calls), video calls (e.g., live video communications with accompanying audio), and/or may handle other tasks.

Figure 2:
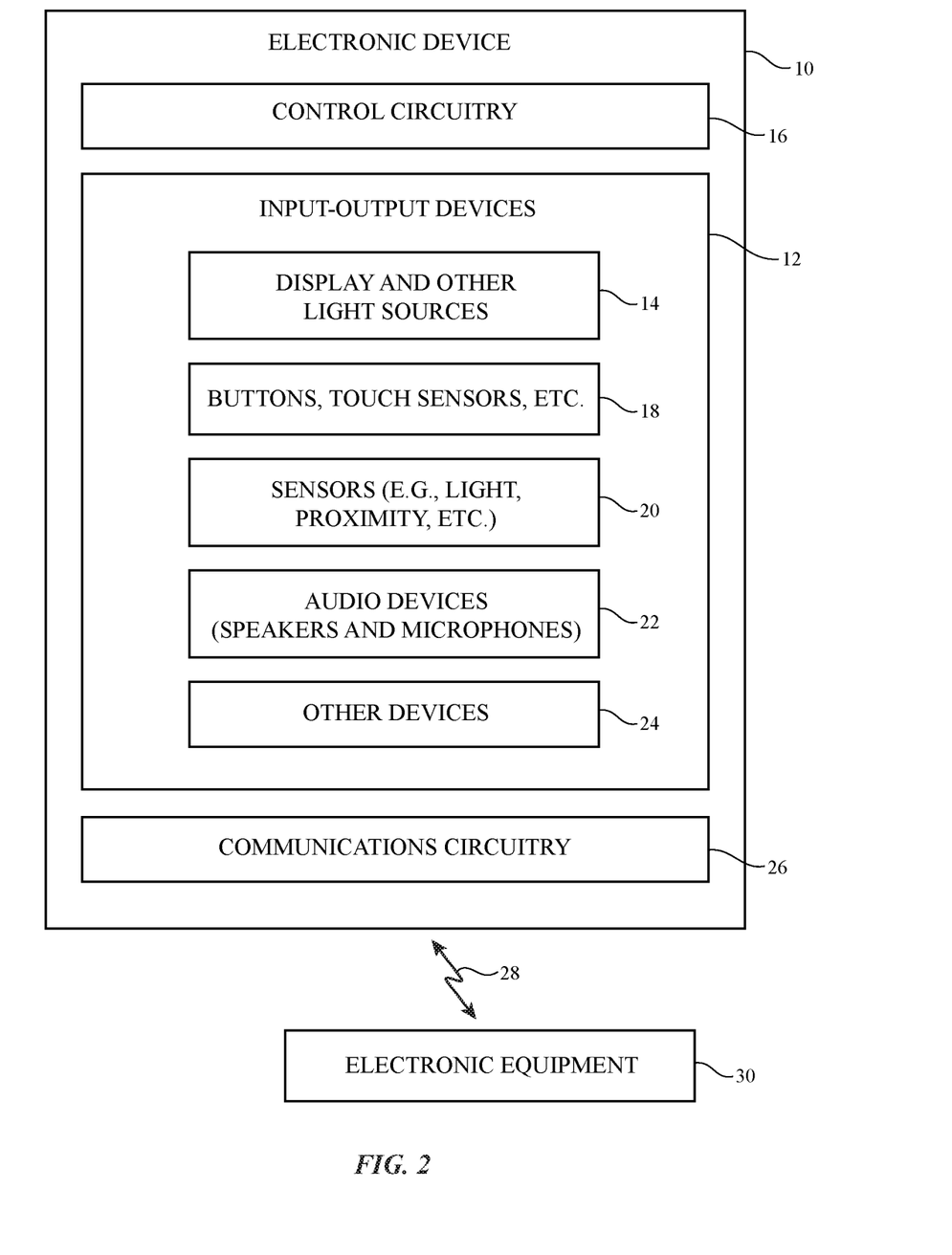
FIG. 2 is a diagram of an illustrative electronic device in accordance with an embodiment.

A schematic diagram of electronic device 10 is shown in FIG. 2. As shown in FIG. 1, electronic device 10 may communicate with external equipment such as electronic equipment 30 using communications link 28. Communications link 28 may be a wireless local area network link, a cellular telephone communications link, other short or long range wireless link, may be a wired link (e.g., an Ethernet link, etc.), and/or may be any other suitable communications path. Electronic equipment 30 may be controlled by device 10 (e.g., when equipment 30 is a gaming unit, set-top box, television, display, computer, tablet computer, cellular telephone, etc.), may be a peer device (e.g., another voice-controlled assistant device such as device 10), and/or may be a controller or other accessory for device 10. External equipment 30 may include home automation equipment and other home or office equipment (e.g., lighting controllers, heating and air conditioning equipment that is controlled by device 10, security equipment, irrigation equipment, audio-visual equipment, etc.).

Device 10 may use communications circuitry 26 to support communications with electronic equipment 30 over link 28. Communications circuitry 26 may include wired and wireless communications circuitry (e.g., a wireless transceiver such as a wireless local area network transceiver and/or cellular telephone transceiver, antennas, etc.). Using communications circuitry 26, device 10 can gather information from a server or other online equipment (e.g., equipment 30) over the internet. For example, device 10 can obtain information on the current weather from a weather server, can obtain news, stock quotes, sports scores, travel information such as transportation schedules, can download email into an inbox supported by device 10, etc.

Information on the current weather, the current temperature, and/or other sensor information (e.g., air pressure, humidity, etc.) may be used in determining how to adjust displays and/or other light-emitting devices in device 10. If, for example, the temperature is cold, device 10 may use display 14 or other light sources to display cold colors (e.g., blue). In response to detecting that the temperature is warm (e.g., by obtaining online temperature information from an online weather source, by using a thermometer, etc.), device 10 may use display 14 or other light sources to display warm colors (e.g., yellow). Device 10 may also display mood lighting, decorative patterns, and/or other visual content (bar graphs, icons, text, etc.) that varies depending on other parameters (e.g., indoor temperature, time of day, received text message count, email inbox message count, online information such as sports scores, stock prices, weather, news, etc.). As an example, device 10 may glow with increasing brightness as incoming messages increase in number. As another example, a team logo may be displayed if a given sports team wins a game, a stock price may be displayed if a predetermined threshold price has been exceeded, a sunshine icon may be displayed if sunny weather is forecast, and/or other information may be displayed on device 10. A user may preselect which types of information are displayed (weather, sports scores, sports results, stock prices, incoming email excerpts or subject lines, text message content, etc.).

As shown in FIG. 2, device 10 may have control circuitry 16. Control circuitry 16 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 16 may be used to control the operation of device 10. The processing circuitry may be based on one or more microprocessors, microcontrollers, digital signal processors, baseband processors, power management units, audio chips, application specific integrated circuits, etc. In some configurations, control circuitry 16 may operate in cooperation with on-line control circuitry (e.g., one or more remote servers, networked computing equipment in a local area network, coupled peer devices, or other remote storage and processing circuitry.

Input-output circuitry in device 10 such as input-output devices 12 may be used to allow data to be supplied to device 10 and to allow data to be provided from device 10 to external devices. Input-output devices 12 may include light-emitting components. For example, input-output devices can include visual output devices 14 such as display(s) and/or other light sources. Visual output devices 14 may include one or more individual light-emitting devices such as light-emitting diode(s), laser(s), and/or lamp(s). Visual output devices 14 may also include arrays of pixels for forming displays such as liquid crystal displays, organic light-emitting diode displays, displays formed from light-emitting diodes on respective crystalline semiconductor dies (microLEDs), etc. Pixel arrays may include any suitable number of pixels (e.g., at least 100, at least 1000, at least 10,000, at least 100,000, fewer than 1,000,000, etc.).

Input-output devices 12 may include input component such as buttons, touch sensors (e.g., capacitive touch sensors, optical touch sensors, etc.), force sensors, and/or other devices for receiving input such as button press input and/or touch or force sensor input.

Sensors 20 may be used in gathering environmental measurements and/or user input and may include ambient light sensors (visible light sensors, color sensitive light sensors, ultraviolet light sensors, etc.), optical proximity sensors, capacitive proximity sensors, temperature sensors (e.g., to measure ambient temperature), force sensors (e.g., for measuring biometric information), gas pressure sensors, heart rate sensors, blood oxygen level sensors (e.g., based on emitted and detected light), electrocardiogram sensors (e.g., sensors for measuring electrical signals on a user's body), particulate sensors (e.g., sensors that use light measurements and/or other measurements to measure particulate concentration in the air), image sensors (cameras), gas pressure sensors, carbon dioxide sensors and/or sensors measuring other gas concentrations, position and/or orientation sensors (e.g., inertial measurement units based on one or more sensors such as accelerometers, gyroscopes, and/or compasses), ultrasonic sensors that measure distance using echolocation (e.g., by emitting ultrasonic signals and detecting corresponding ultrasonic echoes with a microphone), accelerometers for gathering user tap input, sensors that gather hand gestures and other three-dimensional gesture input (e.g., using optical sensing, capacitive sensing, etc.), etc. Audio and/or video feedback may be presented as sensors gather user input. For example, detected hand gestures can be accompanied by audible clicks and/or variations in light output that serve as feedback informing a user that the hand gestures have been successfully detected by device 10.

Device 10 may include audio devices such as one or more speakers (e.g., tweeters, midrange speakers, woofers, subwoofers, etc.) and one or more audio sensors (e.g., microphones for gathering voice command input, microphones that measure ambient noise as part of a noise cancellation system, microphones in echolocation sensors, etc.).

If desired, device 10 may include other input-output devices such as devices 24 (e.g., gaze detection systems, thermal imaging systems, haptic output devices, etc.). Haptic output devices may include piezoelectric devices, electromagnetic actuators, and/or other actuators for generating haptic output.

Device 10 may include one or more batteries, may include a power converter for converting mains power into internal direct-current power, and/or may include other power circuitry (e.g., wireless power circuitry for receiving wirelessly transmitted power, wireless power circuitry for transmitting wireless power to nearby devices, etc.).

In some configurations, some of all of the outer surface of housing 40 may be permeable to sound. For example, fabric, metal, glass, or polymer layers with perforations or other openings, and/or other structures that allow sound to pass may be using in forming sidewalls on sides 42 of housing 40, a wall for upper surface 44 of housing 40, and/or other housing structures. If desired, multiple layers of material that are permeable to sound may be used in forming the walls of housing 40. For example, device 10 may have an outer fabric layer that is permeable to sound and an inner plastic frame that has openings that allow sound to pass. These sound-permeable structures allow sound from speakers in the interior of housing 40 to pass to the exterior of device 10 and allow sound from the exterior of device 10 to pass to microphones in the interior of device 10.

Figure 3:
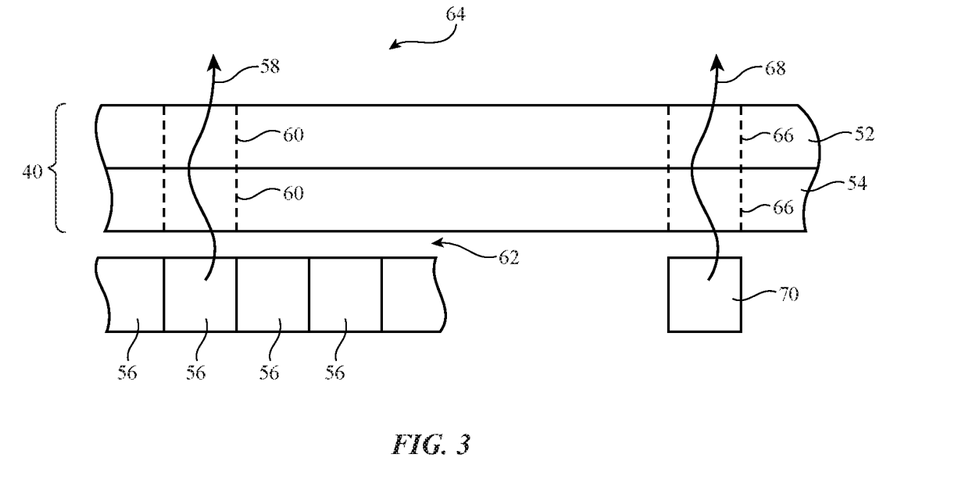
FIG. 3 is a cross-sectional side view of a portion of an illustrative electronic device in accordance with an embodiment.

Device 10 may also be configured to emit light. For example, housing 40 may have one or more layers such as illustrative layers 50 and 52 of FIG. 3. These layers may include, for example, an outer sound permeable fabric layer (e.g., layer 52) and an inner sound permeable layer (e.g., a plastic, glass, or metal structure with perforations or other openings that permit sound to pass). As shown in FIG. 3, light sources 56 may emit light 58 that passes through layers such as sound-permeable layers 50 and 52. Light 58 may, for example, pass through openings 60 in layer 50 and/or layer 52. Openings 60 may be perforations, may be filled with transparent material and/or may be openings filled with air, may be openings between strands of material in woven or knit fabric, may be openings in layers of glass, metal, polymer, or other materials, and/or may be other suitable openings.

Openings 60 may allow both light 58 and sound to pass between device interior 62 to device exterior 64 and/or may be openings that allow only light 58 to pass. In arrangements in which openings 60 are not permeable to sound and/or in which other openings that are more permeable to sound are present in the layer(s) of material forming housing walls for housing 40, sound may pass through sound permeable openings that are separate from openings 60 (see, e.g., sound opening 66 that allows sound 68 to pass from speaker 70 in interior 62 to exterior 64). Openings 60 and/or 66 may be formed by weaving, knitting, or braiding fabric with openings 60 and/or 66 or may be formed using laser cutting and/or other hole-formation techniques.

Figure 4:
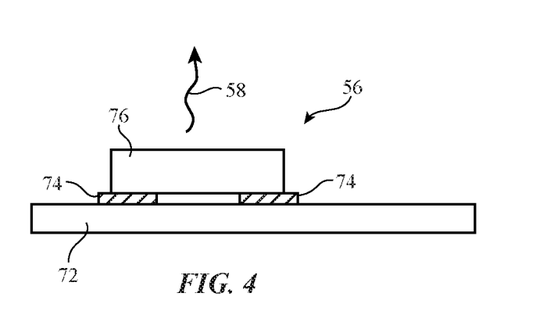
FIG. 4 is a cross-sectional side view of an illustrative light-emitting device having a light source mounted on a substrate such as a printed circuit in accordance with an embodiment.

Illustrative light-emitting devices of the type that may be used in forming visual output devices such as displays 14 of FIG. 1 are shown in FIGS. 4, 5, 6, and 7. In the example of FIG. 4, light-emitting device 56 has a light-emitting component such as component 76 that emits light 58. Component 76 may be a light-emitting diode (packaged or unpackaged), may be a laser diode, may be a lamp, may be an electroluminescent device, and/or may be other suitable circuitry for emitting light 58 in response to applied current. Component 76 may have electrical terminals that are electrically coupled to metal traces 74 on substrate 72. Substrate 72 may be a printed circuit such as a flexible printed circuit or a rigid printed circuit board.

Figure 5:
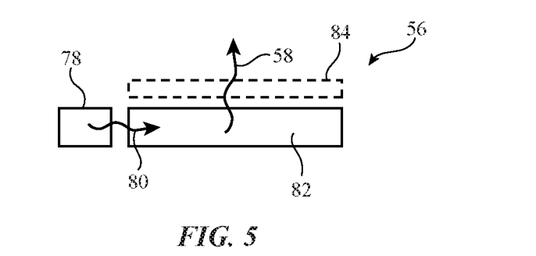
FIG. 5 is a cross-sectional side view of an illustrative light-emitting device having a waveguide such as a fiber waveguide or a light guide layer in accordance with an embodiment.

FIG. 5 shows how light-emitting device 56 may have a light-emitting component 78 (e.g., a light-emitting diode, laser, etc.) that emits light 80 into an edge of light guiding waveguide 82. Waveguide 82 may be a planar light guide layer (e.g., a light guide layer formed from a transparent polymer sheet), may be an optical fiber (e.g., a cylindrical fiber that conveys light internally along its length), and/or may be another suitable light guiding structure. During operation, light 80 that is being conveyed internally in waveguide 82 due to the principal of total internal reflection may be scattered outwardly by light-scattering structures in waveguide 82 and may therefore serve as visible illumination 58 (e.g., light visible by a user of device 10). If desired, light 58 may serve as backlight for a liquid crystal display, electrophoretic display, or other display (see, e.g., backlit display 84 of FIG. 9). Light 58 may also pass through patterned opaque structures (e.g., a layer of black ink with an opening forming an icon or alphanumeric character) to provide a user with a backlit icon, text, etc. Waveguide 82 may overlap a single opening in housing 40 (e.g., to allow light to pass through the opening) and/or may overlap some or all of the walls of housing 40. For example, waveguide 82 may have the shape of a cylinder that provides the cylindrical side surface of housing 40 with backlight (e.g., to backlight an array of pixels that wraps around the cylindrical surface of device 10 to provide illumination through openings surrounding housing 40, etc.). If desired, device 10 may contain multiple waveguides such as waveguide 82 and two or more of these multiple waveguides may overlap.

Figure 6:
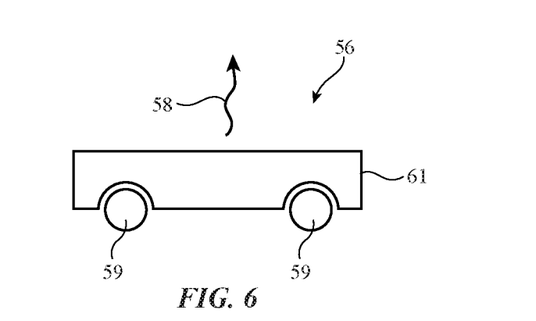
FIG. 6 is a cross-sectional side view of an illustrative light-emitting device coupled to conductive strands such as conductive strands in a fabric layer in accordance with an embodiment.

FIG. 6 shows how light-emitting device 56 may include a light-emitting component such as component 61 (e.g., a light-emitting diode, laser diode, electroluminescent component, lamp, etc.). Component 61 may have terminals that are electrically coupled to conductive strands of material such as conductive strands 59. Strands 59 may be solid metal wires, polymer strands coated with metal, or other conductive strands of material and may, if desired, be incorporated into a layer of fabric in housing 40. Components such as component 61 of FIG. 6 and component 76 of FIG. 4 may, if desired, be light-emitting diodes that are deposited (printed) in a slurry (e.g., so that some of the deposited light-emitting diodes may electrical contact to metal traces and/or wires and so that others do not). Slurry-based diode mounting schemes may be used to reduce process complexity. If desired, welds or solder joints may be used in coupling components 61 to conductive strands.

Figure 7:
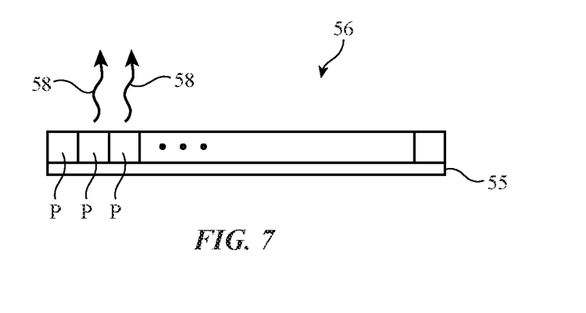
FIG. 7 is a cross-sectional side view of an illustrative light-emitting device with an array of pixels in accordance with an embodiment.

In the example of FIG. 7, light-emitting device 56 has an array of pixels P that are individually controlled to produce light 58. The pixel array of device 56 of FIG. 7 allows device 56 of FIG. 7 to display images for a user (e.g., device 56 of FIG. 7 may be a display). Pixels P may be formed on a common substrate such as substrate 55 (e.g., a polymer layer, a layer of glass, etc.) and/or may be formed from light-emitting diodes that are individually packaged and/or individual bare crystalline semiconductor dies containing respective light-emitting diodes. In arrangements in which pixels P are mounted individually in device 10, mounting arrangements such as the illustrative mounting arrangements of FIGS. 4 and 6 may be used (e.g., components 76 and 61 of FIGS. 4 and 6 may serve as pixels P in an array of pixels).

Figure 8:
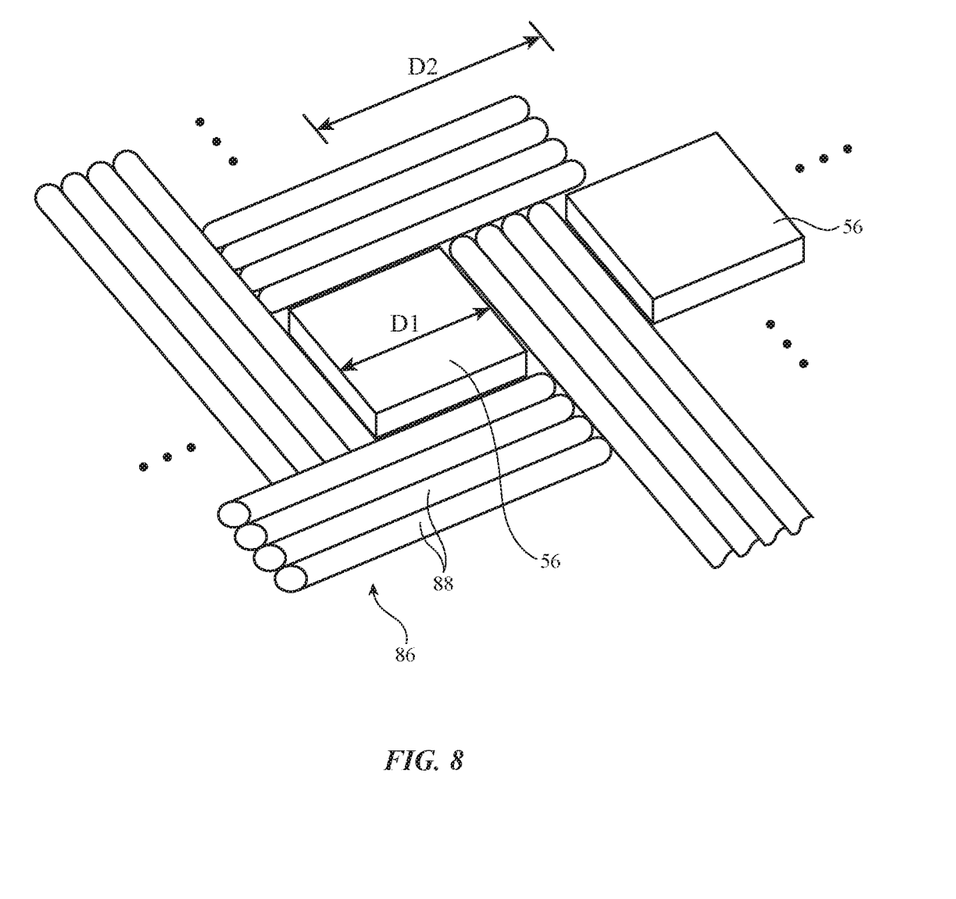
FIG. 8 is a perspective view of a fabric layer with openings in which light-emitting devices have been formed in accordance with an embodiment.

FIG. 8 is a perspective view of a portion of a fabric layer that may be used in forming device 10. As shown in FIG. 8, fabric layer 86 may be formed from strands of material 88 that have been woven or otherwise intertwined (e.g., using knitting techniques, braiding techniques, etc.). Woven fabric or other fabric such as fabric layer 86 may have openings (see, e.g., the openings that receive light-emitting devices 56 in the example of FIG. 8). These openings may form acoustic and/or optical openings such as openings 60 and 66 of FIG. 3. Sound (and, if desired, light) may also pass through gaps between adjacent strands 88 in fabric layer 86.

Fabric layer 86 may form an outer housing layer in housing 40 (e.g., layer 52 of FIG. 3) and/or may form one or more inner housing layers in housing 40 (see, e.g., layer 54 of FIG. 3). In the illustrative configuration of FIG. 8, openings have been formed in fabric layer 86 that receive corresponding light-emitting devices 56 (e.g., light-emitting diodes, etc.). Light-emitting devices 56 such as light-emitting diodes may form pixels P in a pixel array (e.g., so that devices 56 can serve as pixels in a display) and/or may form lower-resolution light-based output devices (e.g., status indicator lights, backlight for icons in a patterned opaque layer, etc.). Light-emitting devices 56 may be mounted to one or more different substrates (e.g., one or more printed circuits) ad/or may be integrally formed with other circuitry on a substrate. For example, light-emitting devices 56 may be organic light-emitting devices on a flexible organic light-emitting diode display substrate.

With one illustrative configuration, light-emitting devices 56 are packaged or unpackaged rectangular devices and have lateral dimensions D1 of about 50 microns to 200 microns, at least 30 microns, at least 50 microns, at least 100 microns, less than 500 microns, less than 300 microns, or other suitable size. The corresponding openings in fabric layer 86 may have the same size or may be larger or smaller (e.g., openings in layer 86 may have lateral dimensions of at least 50 microns, at least 100 microns, at least 200 microns, at least 300 microns, less than 500 microns, or other suitable size).

To provide an array of pixels P formed from light-emitting devices 56 with sufficient resolution to display images, it may be desirable for the device-to-device spacing of devices 56 (spacing distance D2) to be about 1-2 times D1, to be at least 1 D1, to be at least 2 D1, to be at least 3 D1, to be less than 4 D1, to be less than 2 D1, or to be less than 1 D1 (as examples). The array of light-emitting diodes or other pixels P may contain at least 10 light-emitting diodes or other pixels P, at least 100 light-emitting diodes or other pixels P, at least 1000 light-emitting diodes or other pixels P, at least 10,000 light-emitting diodes or other pixels P, fewer than 1,000,000 light-emitting diodes or other pixels P, or fewer than 1000 light-emitting diodes or other pixels P (as examples).

In some arrangements, multiple fabric layers such as fabric layer 86 may form fabric for device 10. For example, housing walls in housing 40 may be formed form a layer of fabric that includes multiple woven layers such as layer 86 of FIG. 8. Multi-layer fabric walls may include multiple individual fabric layers that are laminated together using adhesive or may include a single multi-layer fabric (e.g., a fabric in which multiple layers of warp and weft strands are woven together).

The strands of material in fabric layer 86 may include polymer strands, strands of cotton and other natural materials, and strands including metal and other conductive materials. Conductive strands may be formed from metal wire or a polymer core coated with a layer of metal or other conductive material. Conductive strands may be bare so that conductive materials such as metal are exposed or may be covered with a polymer insulating coating and/or other coatings. Insulating strands may be formed form dielectrics such as polymer or glass.

In some arrangements, fabric or other layers of material in device 10 may include transparent strands of material (optical fibers). Transparent strands may serve as waveguides for carrying light. These waveguides may be roughened at one or more locations along their lengths to create light-scattering structures that cause light to be selectively emitted from the waveguides. For example, one or more transparent polymer strands or glass strands may serve as waveguides such as waveguide 82 of FIG. 5 and may be provided with light from a coupled light-emitting diode or other light-emitting component 78. The portions of a fiber waveguide or a light guide layer that is guiding light from a light-emitting diode may be overlapped by one or more openings in a fabric layer and/or other layers of material in housing 40 of device 10. In some configurations, light-emitting devices 56 may include electroluminescent wire or other light-emitting structures that can be woven or otherwise incorporated into a layer of fabric or other material for housing 40.

Figure 9:
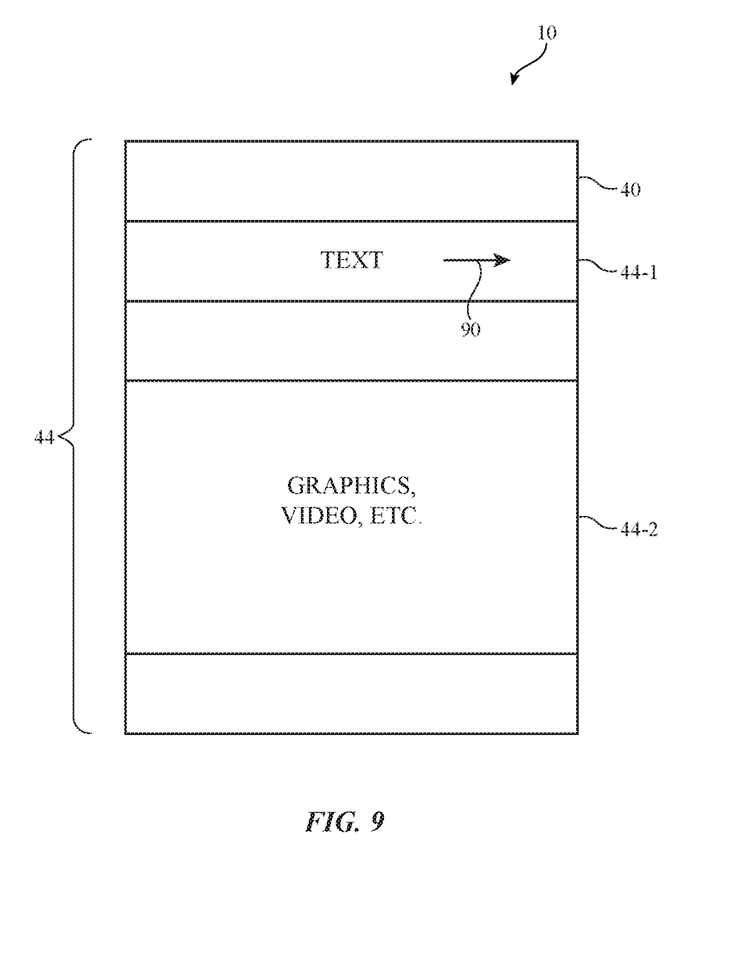
FIG. 9 is a side view of an illustrative electronic device that is displaying content for a viewer in accordance with an embodiment.

FIG. 9 is a side view of an illustrative device such as device 10 of FIG. 1. As shown in FIG. 1, portions of device housing 40 such as sidewall portion 44 may be provided with visual output using light-based components such as light-emitting diodes, pixel arrays, etc. (see, e.g., light sources 56). If desired, different portions of housing wall 44 may be provided with different types of content. For example, portion 44-1 may be provided with text. The text may scroll automatically in direction 90 and may, if desired, scroll horizontally around most or all of the circumference of device 10 (e.g., portion 44-1 may form a ring-shaped band or other ring-shaped region that surrounds the periphery of device 10). In addition to or instead of horizontally scrolling text or other visual information in direction 90, text or other visual information may be scrolled vertically. Portion 44-2 of the side of housing 40 may be provided with still and/or moving images containing text, icons and other graphical elements, video (with accompanying audio), and/or other visual content. In some configurations, patterns of light (e.g., oscillating waveforms to indicate that a voice recognition function is active and/or processing) may be displayed in region 44-2 when appropriate. Additional regions of sidewall portion 44 and/or the top of device 10 may also be provided with still and/or moving images or other content.

The content that is provided with the visual output devices of device 10 (e.g., on side portions of device 10, on upper portions of device 10, etc.) may include images displayed on pixel arrays, may include icons, alphanumeric characters, and other symbols displayed using backlit opaque structures having symbol-shaped openings and/or symbol shaped backlight structures such as symbol-shaped light guides or array of light-emitting devices, may include decorative trim patterns (e.g., a red circle running along the upper edge of housing 40), and/or may include other visual output information.

In some configurations, the information that is displayed by a display or other light source(s) in device 10 may be associated with media playback. For example, a media playback volume indicator may be presented in a band around the perimeter of device 10. The volume indicator may, for example, wrap around all of device 10 and may have a height above the surface on which device 10 is resting that is proportional to the current audio playback volume for device 10. When playback volume is increased, the height of the illuminated band in region 44 of device 10 may be increased proportionally. When playback volume is muted, the illuminated band may be removed or changed in color (as examples).

Device 10 may communicate with a display device such as a computer with a display, a stand-alone display, a television, or other device with a display. As an example, one or more devices 10 may be wirelessly linked to a television system that is displaying movie content. During movie playback, there may be bright flashes of light (e.g., flashes of orange if the movie contains explosions). To enhance the orange light that is present in the currently playing movie or other media, displays 14 or other visual output devices on device 10 may present synchronized content (e.g., displays 14 may flash bright orange in synchronization with the orange content on the television or other display). Device 10 may automatically sense ambient light color changes (e.g., the appearance of orange due to explosions on a television) and may adjust the color of the output light on display(s) 14 accordingly or device 10 may be provided with a synchronized lighting schedule (e.g., orange at 70% intensity for 1 minute, yellow at 5% intensity for 17 minutes, etc.) that is based on knowledge of the content being displayed on the television or other device.

Figure 10:
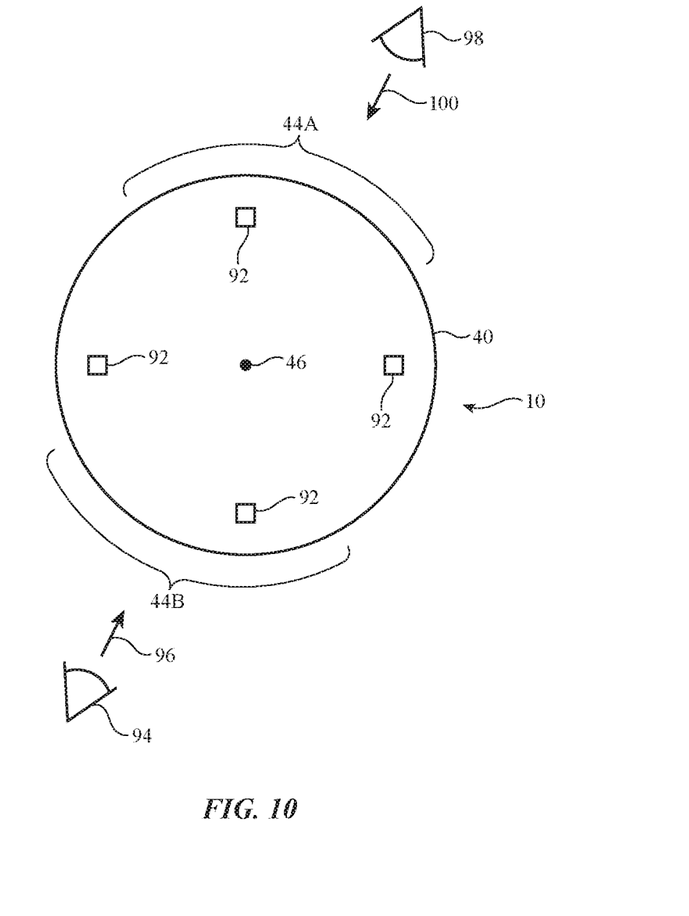
FIG. 10 is a top view of an illustrative electronic device showing how different content may be displayed simultaneously on difference sides of the device for different respective viewers in accordance with an embodiment.

In some configurations, device 10 may be used by multiple users simultaneously. Consider, as an example, the illustrative top view of device 10 that is shown in FIG. 10. In this configuration, device 10 is running a game or other software. The game can receive input from users such as users 94 and 98 and can supply corresponding output on visual output devices (e.g., a display on sidewalls 44 and/or other portions of housing 40). Because the users are located on opposing sides of device 10 (in this example), the control circuitry of device 10 can use the visual output devices in device 10 to display first content in region 44B for viewing by user 94 who is viewing device 10 in direction 96 and to simultaneously display second content in region 44A for viewing by user 98 who is viewing device 10 in direction 100. The first content may be hidden from view by the second user and the second content may be hidden from view by the first user, allowing the first and second users to play a game in which the information displayed to each user is private and not shared.

Sensors 92 (e.g., cameras, proximity sensors, etc.) in device 10 can be used to monitor the positions of users 94 and 98 so that the positions of regions 44A and 44B can be dynamically adjusted. If desired, keystone distortion in displayed images (e.g., distortion due to a user's standing position) can be corrected dynamically during the presentation of visual content on display 10. For example, if user 94 is sitting and viewing region 44B head on, images without keystone distortion correction may be displayed in region 44B. If, however, user 98 is standing adjacent to device 10 and is viewing region 44A at an angle, keystone image correction operations may be performed on the content being displayed in region 44A to compensate for the user's viewing angle. Images that are compensated in this way will appear to be less distorted than images that are not compensated. If desired, device 10 can display shared information for multiple users during a game (e.g., lyrics during a karaoke game, yoga assistance information during an exercise routine, etc.).

Device 10 can be used as a communications device. For example, device 10 can operate as a telephone (e.g., a voice-over-internet protocol telephone), can handle video communications (e.g., live video calls with accompanying audio), or can serve as one terminal in a multi-terminal in-home intercom system. Device 10 may, for example, communicate over an in-home wired or wireless network with other devices 10 in other rooms of a home. This allows a user in one room to talk to a user in another room. Users can call each other using voice commands that direct device 10 to form a voice link with an appropriate device 10 in another room. Devices 10 can also be used to form a baby monitor system (e.g., by picking up audio and/or video in a baby's room with a first device 10 and transmitting that audio and/or video in real time to a corresponding second device in another room for presentation to a parent).

A user may, if desired, use a cellular telephone or other eternal equipment (e.g., equipment 30 of FIG. 2) to supply touch screen input to device 10. Consider, as an example, a scenario in which multiple users are viewing device 10. In this situation, a sidewall display or other display in device 10 can be used as a shared output device (e.g., a digital whiteboard). A user may draw objects to be displayed on display(s) 14 using a touch sensor in the user's external equipment (e.g., a cellular telephone or tablet touch screen, a touch sensor in a laptop, etc.). If desired, a user may use the display(s) of device 10 to display a graphical presentation stored on equipment 30 or may otherwise direct device 10 to display information from equipment 30.

In some configurations, equipment 30 may be controlled by device 10 (e.g., device 10 may serve as a remote control for equipment 30). For example, a user may supply voice commands, touch sensor input, or other input to device 10 that device 10 conveys to equipment 30 via link 28. The commands may direct equipment 30 to select media for playback on a display and speakers in equipment 30, to make volume adjustments, to make display brightness adjustments, to make channel change adjustments, and/or to make other changes to the operation of equipment 30. When device 10 serves as a remote control for media playback equipment (e.g., an audio system, a television, or other audio-visual equipment), display(s) 14 may be used to display media playback information (e.g., currently playing track information such as a song title and artist, next-to-play track information, shows on alternate television channels, shows scheduled at subsequent time slots on a currently active television channel, etc.). While presenting audio information and/or video information using speakers and display(s) 14 in device 10, device 10 can use display(s) 14 to present information on the currently playing media track, upcoming tracks, lyrics, ratings information, artist information, current channel or service name, and/or other information related to the audio and/or video being presented to the user.

If desired, sensors 92 may include echolocation sensors. Using echolocation sensors (e.g., sensors that emit sound and that receive reflected sound using microphones) and/or other sensors (e.g., cameras, proximity sensors, color ambient light sensors, microphones that measure ambient sound and other sound, etc.), device 10 may determine the position and orientation of device 10 relative to nearby external objects. The nearby objects may include a wall in a home or other obstructions. Device 10 may sense the location of these obstructions and may use information on the obstruction location to determine which portions of the visual display devices (e.g., displays 14) are not obstructed. Visual content can then be displayed on the unobstructed portions of device 10. Device 10 may also use information on the surroundings of device 10 (e.g., the color of a counter on which device 10 is resting, the color of a counter backsplash adjacent to device 10, etc.). Based on information on the appearance (color, texture, etc.) of the surroundings of device 10, device 10 can make appropriate adjustments to the content on displays 14. For example, device 10 can adjust portions of displays 14 to mimic the colors of external objects and thereby allow device 10 to visually blend into its surroundings. As another example, device 10 can present content on displays 14 that contrasts with the colors of external objects surrounding device 10.

The content provided on the visual output devices of device 10 may include a graphical acknowledgement (e.g., a graphical pattern that indicates to a user that a wake command or other voice command or input has been satisfactorily received and that device 10 is now performing a desired task such as awaiting further voice input). Visual feedback in the form of an abstract visual pattern and/or text or other visual feedback may help inform a user of the current operating state of device 10 (e.g., whether device 10 is ready to receive input or not). This may assist a user in interacting with device 10.

The content displayed on displays 14 of device 10 may include a text transcription of currently spoken voice commands or other voice input. This may help provide a user with visual feedback during voice interactions with device 10. Text may be scrolled vertically and/or horizontally, may be displayed on a side of device 10 facing a user and/or facing away from a nearby wall or other external obstruction, etc. Additional visual feedback may be provided in the form of an animated assistant. The animated assistant may be a lifelike or cartoon avatar (e.g., a computer-generated graphical representation of a human face) with moving lips synchronized to synthesized voice. The synthesized voice may be used to prompt a user to supply input, to confirm that an action has been taken by device 10 in response to user voice commands or other user input, and/or to otherwise provide vocal output to a user. The accompanying visual feedback may have a human-like visual form, may be an abstract pattern of light (e.g., a colorful graphic image that pulses or otherwise changes appearance in synchronization with synthesized speech or other output), and/or may have other suitable visual forms. If desired, visual assistants (e.g., avatars, etc.) may be displayed statically on device 10 (e.g., on the sidewalls of device 10 or other surfaces with visual output devices). In some embodiments, synthesized voice may be provided with accompanying text (e.g., text of the synthesized voice to assist hearing impaired users). The text may include internet search results and other database information that is supplied in response to a user database query (e.g., a voice query to an online database, input from a touch sensor, keyboard, or other input device, etc.).

When playing media for a user, device 10 may display text and/or other visual output representing currently playing media (e.g., audio tracks, video, etc.). Notifications may also be displayed by the visual output devices of device 10 (e.g., notifications of incoming email messages or other messages, notifications of calendar events, etc.). As an example, device 10 may be linked to an online account of a user (e.g., an email account, calendar account, etc.) and/or may otherwise receive personalized content associated with the user. Information associated with the user's account may be automatically retrieved (e.g., device 10 may automatically log into the user's account) when a camera or other sensor in device 10 recognizes that the user is present in the vicinity of device 10. Personalized content associated with the user's account (notifications, messages, calendar entries, etc.) may be displayed on the sides of device 10 or elsewhere in device 10.

Device 10 may handle the presentation of content to users differently in different modes of operation. For example, a device such as device 10 may operate in a work mode when located at a work location and may be operated in a home mode when located in a home environment. Content may be displayed with different amounts of privacy and/or other attributes based on the current operating mode of device 10. For example, when device 10 is operated in an entertainment mode, information on currently playing media may be displayed on displays 14, but personal content such as email messages and text messages may not be displayed unless explicitly requested by a user. As another example when device 10 is operated in a family mode, messages that originate with family members may be displayed, while other messages may be suppressed. In yet another illustrative scenario, device 10 may be operated in a personal mode, in which all messages and other content available in a user's account may be displayed on displays 14.

Content presentation may be customized based on criteria such as the location of device 10 within the home, the time of day and date, the proximity of individuals to device 10, the current operating mode for device 10 (family mode, entertainment mode, etc.) and/or other content presentation criteria. As an example, peaceful visual content may be displayed and peaceful music may be played in a living room environment at night and energetic visual content may be displayed and energetic music may be played in a kitchen environment in the morning. On holidays, holiday-specific visual content may be displayed (e.g., colors following a holiday motif, holiday-specific screen-saver images) and holiday-specific music may be automatically played. On a user's birthday, a birthday song may be played when the user's presence is detected and a happy birthday greeting may be displayed. Content may be presented upon detecting that the user has come within proximity of device 10 or upon satisfaction of other presentation criteria.

If desired, movement of device 10 (e.g., motion detected with an inertial measurement unit (e.g., an accelerometer, gyroscope, and/or compass) may be used in determining how to present visual and/or audio information to a user with device 10. For example, movement of device 10 may prompt device 10 to ask the user (e.g., with computer-generated voice) whether the appearance of device 10 should be updated to reflect the new surroundings of device 10.

In some situations, multiple users may be present in the vicinity of device 10. In this type of scenario, the information that is visually presented on device 10 and/or the audio information that is played for the user may be selected based on the attributes and preferences of the multiple users. As an example, when a first user is detected as being closer to device 10 than a second user, musical preferences associated with the first user may be prioritized over musical preferences associated with the second user. In response to detecting that a user with impaired hearing or vision is in the vicinity of device 10, device 10 can take appropriate corrective action (e.g., by increasing playback volume, by enhancing the brightness or sharpness of displayed content, etc.). Users with color recognition deficiencies can be accommodated by performing color blind image correction operations on visual information displayed on the visual output device(s) of device 10.

User proximity to device 10 may be measured using proximity sensors or other equipment. If desired, the identities of individuals in the vicinity of device 10 can be determined using facial recognition (e.g., by performing image processing operations on images captured with cameras in device 10). Camera data may also be used to measure the distance of users to device 10. If desired, the distances of users to device 10 may be measured by measuring the distance of the user's device(s) to device 10 (e.g., by using time-of-flight or received-signal-strength radio-frequency measurements to determine whether a first user's wristwatch is closer to device 10 than a second user's wristwatch, etc.), and/or by measuring the locations of users using other techniques (echolocation, infrared cameras, gaze detection systems, capacitive proximity sensors, optical proximity sensors, etc.).

Device 10 may analyze a user's voice (e.g., when a user is supplying voice commands such as database queries and/or other commands to device 10). If vocal stress is detected in captured voice information, device 10 may make adjustments to content being presented to the user. For example, if voice loudness or stress patterns indicate that a user is stressed, the color and/or brightness of a lighting pattern on a visual output device in device 10 may be adjusted accordingly (e.g., to reflect elevated stress or to try to alleviate stress by creating a calming environment). In arrangements in which device 10 is displaying an avatar representing a digital assistant, the avatar (e.g., a humanistic avatar, a simplified graphical representation of a digital assistant such as an emoji-based avatar, etc.) may be adapted depending on the user's mood. If, for example, sadness is detected in the user's voice, the avatar may change accordingly (e.g., to a sad emoji to represent user sadness or to a happy emoji to counteract the detected sadness). The avatar can also be changed depending on the nature of content currently being presented to a user. If, for example, a user asks a digital assistant for information on purchasing a birthday gift, the digital assistant may use a happy emoji to present results.

Message content may be presented to a user with an avatar. For example, an avatar representing a virtual assistant may perform voice synthesis operations on the text of a received email. The voice synthesis operations may present the text of the email in audible form (vocalized words). Display(s) 14 may simultaneously present a moving representation of a face that is synchronized to the synthesized voice. The expression on the face (sad, happy, angry, etc.) may be selected based on a sender-selected emotion setting in the message and/or based on analysis of keywords in the text of the message.

Figure 11:
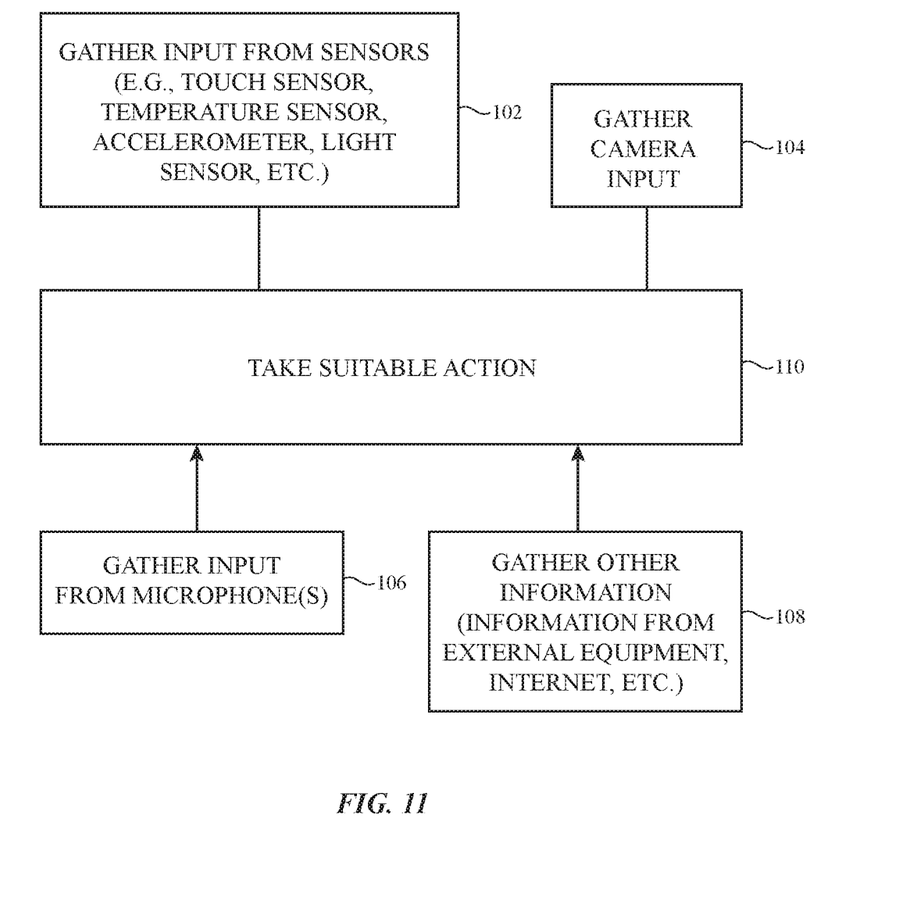
FIG. 11 is a flow chart of illustrative operations involved in operating an electronic device in accordance with an embodiment.

FIG. 11 is a flow chart of illustrative operations involved in using device 10.

During the operations of block 102, device 10 may use sensors 20 and other user input devices such as buttons 18 to gather input from a user and from the environment surrounding device 10. User input such as voice input and information on ambient sounds may be gathered during the operations of block 106. At block 108, device 10 may communicate with external equipment 30 (e.g., to gather online information such as weather, email, news, etc.). During the operations of block 104, camera information may be gathered (e.g., by capturing images with one or more cameras to detect faces of individuals surrounding device 10, to gather information on the operating environment of device 10, etc.).

During the operations of block 110, device 10 may take suitable action in response to the information gathered during blocks 102, 106, 108, and 104. For example, device 10 may supply audio output using speakers 22 and/or may use visual output devices 14 to supply visual output. Control signals for remote equipment 30 may also be produced or device 10 may otherwise interact with external equipment 30.

The foregoing is merely illustrative and various modifications can be made to the described embodiments. The foregoing embodiments may be implemented individually or in any combination.

What is claimed is:

1. An electronic device, comprising:
   a housing;
   fabric covering a portion of the housing;
   sensors in the housing that determine a location of the housing relative to a user and relative to external objects; and
   a visual output device in the housing that emits light through the fabric to display visual information based on the location of the housing, wherein the sensors are configured to determine that portions of the visual output device are unobstructed by the external objects and face the user, and wherein the visual output device is configured to display the visual information on the unobstructed portions of the visual output device that face the user.

2. The electronic device defined in claim 1 wherein the sensors are selected from the group consisting of: echolocation sensors, cameras, proximity sensors, color ambient light sensors, and microphones.

3. The electronic device defined in claim 1 wherein the sensors determine an appearance of the external objects and wherein the visual output device is configured to display the visual information based on the appearance of the external objects.

4. The electronic device defined in claim 3 wherein the visual information comprises an image and wherein the visual output device is configured to display the image in a color that is matched to a color of the external objects.

5. The electronic device defined in claim 3 wherein the visual information comprises text and wherein the visual output device is configured to display the text in a color that is contrasted with a color of the external objects.

6. The electronic device defined in claim 1 further comprising:
   a microphone configured to receive a voice command, wherein the visual information comprises an acknowledgement that the microphone has received the voice command.

7. An electronic device configured to be used by a user to control an external device having a display that displays images having a color, the electronic device comprising:
   a cylindrical housing;
   a fabric having openings that overlaps a portion the cylindrical housing;
   a first sensor that determines a location of the cylindrical housing relative to the user;
   a second sensor that senses ambient light color changes;
   a microphone that receives voice commands from the user; and
   a light-emitting device that emits a pattern of light through the openings in the fabric based on the location of the cylindrical housing and the received voice commands, wherein the light-emitting device is configured to emit the pattern of light with a color that matches the color of the images displayed by the external device, and wherein the light-emitting device is configured to automatically adjust the color when the second sensor detects the ambient light color changes.

8. The electronic device defined in claim 7 wherein the light-emitting device emits the pattern of light in a direction that is oriented toward a position of the user in response to receiving the voice commands.

9. The electronic device defined in claim 8 further comprising:
   control circuitry that is configured to dynamically adjust a location of the pattern of light on the light-emitting device based on the position of the user.

* * * * *